Dec. 8, 1931.   J. F. LIVINGOOD   1,835,412
DIFFERENTIAL TRANSMISSION
Filed Jan. 31, 1930   2 Sheets-Sheet 1
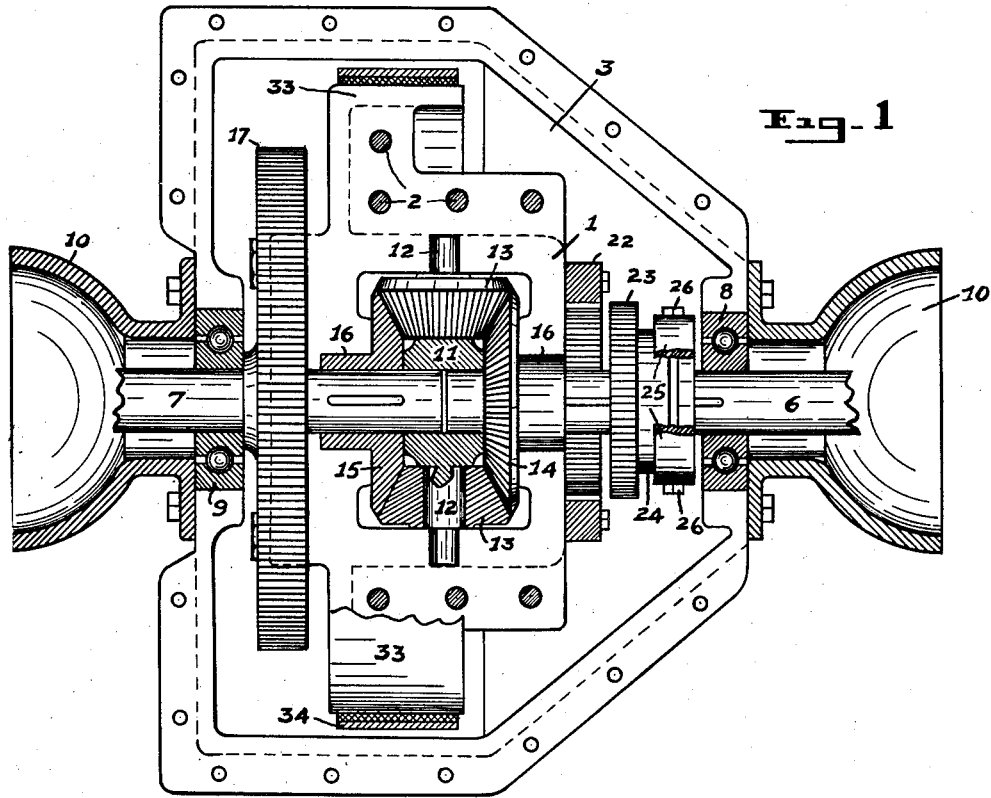
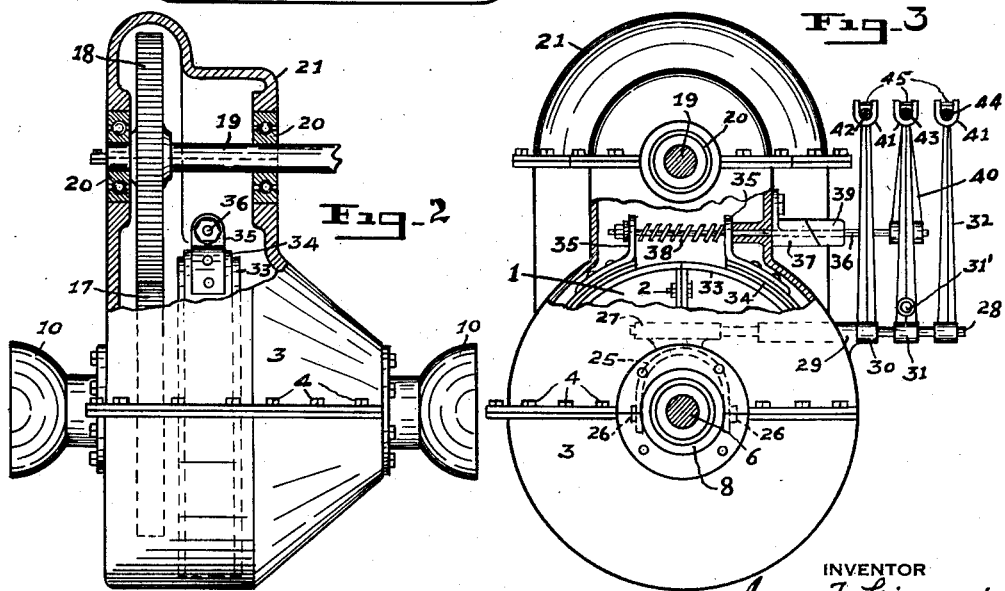
INVENTOR
Jesse F. Livingood
By Jack R. Snyder
Attorney Dec. 8, 1931.   J. F. LIVINGOOD   1,835,412
DIFFERENTIAL TRANSMISSION
Filed Jan. 31, 1930   2 Sheets-Sheet 2
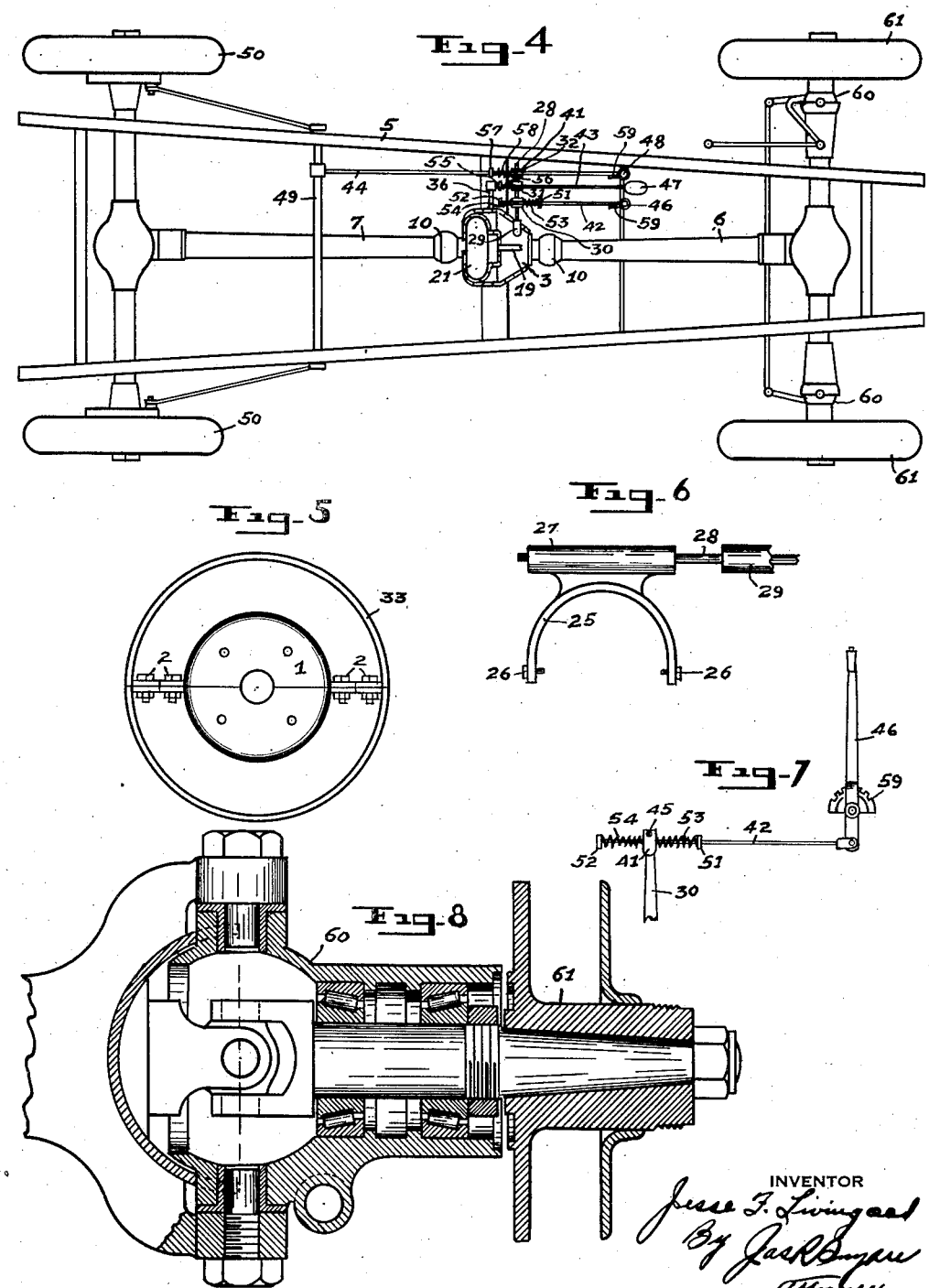

Patented Dec. 8, 1931

1,835,412

UNITED STATES PATENT OFFICE

JESSE F. LIVINGOOD, OF WEST FINLEY, PENNSYLVANIA, ASSIGNOR OF ONE-FIFTH TO ROBERT A. CARROLL, OF WEST FINLEY, PENNSYLVANIA

DIFFERENTIAL TRANSMISSION

Application filed January 31, 1930. Serial No. 424,846.

My invention relates to a differential transmission, and while primarily intended for motor vehicles, it will be obvious that the device may be employed for any other purposes wherein it is found to be applicable.

Important objects of the invention are to provide a transmission, of the character described, which establishes an efficient differential four-wheel drive mechanism for motor vehicles, and provides all of the advantages of such driving arrangement, which embodies a novel brake element operable to uniformly retard the vehicle, and which may be readily installed in a motor vehicle already constructed as well as form a component part of a new motor vehicle structure.

Further objects of the invention are to provide a device of the class stated, which is simple in its construction and arrangement, strong, durable and highly efficient in its use, compact, conveniently operable and comparatively inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawings wherein like numerals of reference designate corresponding parts throughout the several views:—

Figure 1 is a top view of a differential transmission, constructed in accordance with the invention, having the top housing section and a gear carrier section removed therefrom, and being partly in cross section.

Figures 2 and 3, are respectively, side and front views thereof, with portions broken away and in cross section.

Figure 4 is a diagrammatic top view of a motor vehicle chassis embodying the present invention.

Figure 5 is a front view of the gear carrier.

Figure 6 is a front view of the shifting element for the shiftable connecting gear.

Figure 7 is a side view of the transmission control mechanism.

Figure 8 is a longitudinal cross sectional view of a front wheel axle and of associated parts.

Referring in detail to the drawings 1 denotes a split gear carrier, which is joined together by a plurality of screw bolts 2. The gear carrier is completely enclosed in a split housing 3, which is likewise joined together by a plurality of screw bolts 4, and adapted for being fixedly secured in proper position, in any suitable manner, to the motor vehicle chassis 5.

A front drive shaft 6 and a rear drive shaft 7 have their respective ends disposed in close proximity to each other, and extend through the housing 3 and into the gear carrier 1. The front drive shaft 6 is journaled for rotation in a ball bearing 8, which is carried in the front end of the housing 3, and the rear drive shaft 7 is likewise journaled for rotation in a similar ball bearing 9, which is carried in the rear end of the housing 3. The drive shafts 6 and 7 are provided with universal joints (not shown), which are surrounded by the torque tubes 10, and operable to establish the necessary flexibility ordinarily required for these operations.

The drive shafts 6 and 7 have their adjacent ends revolubly mounted in a spider 11, which is disposed within the gear carrier 1. The spider 11 includes a pair of fixed, diametrically disposed bearing arms 12, which have their outer end portions connected in the side wall of the gear carrier 1, whereby the spider 11 will rotate with the latter.

A beveled spider gear 13 is revolubly mounted on each of the bearing arms 12, and meshes with a pair of correspondingly beveled shaft gears, indicated at 14 and 15, which are fixedly keyed to respective ends of the drive shafts 6 and 7 to rotate with the latter. The shaft gears 14 and 15 are provided with hubs 16, which are journaled for rotation in respective end walls of the gear carrier 1. The spider 11, together with the spider gears 13 and the shaft gears 14 and 15 are all mounted and housed within the carrier 1, and, of course, suitably lubricated.

A large carrier gear 17 is fixedly secured to the rear end of the carrier 1, and the rear drive shaft 7 extends loosely through the former. The carrier gear 17 meshes at its top with a driving gear 18, which is fixed on a transmission shaft 19. The latter is suitably journaled for rotation, as at 20, in the split housing top 21. The transmission shaft 19 constitutes a part of the usual power transmission mechanism (not shown) of the type now commonly employed in motor vehicle construction.

A gear ring 22, having internal gear teeth, surrounds the front drive shaft 6, and is fixed against the front end of the gear carrier. A connecting gear 23, provided with an integrally formed, circumferentially grooved hub 24, is slidably mounted on the front drive shaft 6, but is keyed to the latter to rotate therewith. The connecting gear 23 is shiftable on the front drive shaft 6 to engage and disengage the gear ring 22 for the purpose hereinafter set forth.

A shifting yoke 25 pivotally and slidably engages, as at 26, the grooved connecting gear hub 24 at diametrically opposed sides of the latter. The yoke 25 is provided at its top with an integrally formed connecting sleeve 27, which is fixed to the inner end of a horizontally disposed operating shaft 28. The shaft 28 is journaled for rotation in a bearing 29, formed in the housing 3, and projects laterally at one side of the latter. The partial rotation of the operating shaft 28 will shift the connecting gear 23 into and out of engagement with the gear ring 22.

The operating shaft 28 is provided with three fixed vertically extending operating arms, respectively indicated at 30, 31 and 32, any of which will operate the yoke 25 to shift the connecting gear 23 on the front drive shaft 6 in the manner and for the purpose set forth. The arm 31 is provided with a pivotal joint 31' for the purpose hereinafter described.

The gear carrier 1 is formed to provide a brake drum 33, which is disposed forwardly of the carrier gear 17. The brake drum 33 carries a surrounding brake band 34, of the ordinary construction, which is provided with the usual pair of compression lugs 35 disposed at the top thereof. A brake shaft 36 extends horizontally through the pair of lugs 35, and is journaled for rotation in a cam bearing 37 fixed against the side of the housing 3.

A spiral spring 38 is mounted on the brake shaft 36, between the pair of lugs 35, and normally functions to force the latter apart for maintaining the brake band 34 in the released position on the brake drum 33.

A cam sleeve 39 is fixed on the brake shaft 36 and upon rotation of the latter, is operable for engaging the cam bearing 37 to shift the lugs 35 toward each other for drawing the brake band 34 around the drum 33 to effect the braking operation. A vertically disposed operating arm 40 is fixed to the outer end of the brake shaft 36 and is disposed directly rearward of the operating arm 31.

Each of the operating arms 30, 31, 32 and 40, is provided with a substantially U-shaped head 41 for loosely connecting the latter with respective connecting rods, indicated at 42, 43 and 44. The latter are loosely maintained in respective heads 41, by pins 45, which extend transversely through said heads above said rods.

The rod 42 connects the arm 30 with an independent operating lever 46, the rod 43 connects the arm 31 and the arm 40 with the service brake pedal 47, and the rod 44 connects the arm 32 with the emergency brake lever 48. The rear end of the rod 44 likewise connects with the usual braking mechanism 49 adapted for retarding the movement of the rear wheels 50 of the motor vehicle.

The rod 42 carries a pair of fixed collars 51 and 52 which are disposed at respective sides of the head 41, of the arm 30. A spring 53 is mounted on the rod 42 between the collar 51 and the associated head 41, and a similar spring 54 is mounted on the rod 42 between the said head 41 and the collar 52. A collar 55 is fixed on the rod 43 rearwardly of the head 41 of the arm 31. A spring 56 is mounted on the rod 43 between the collar 55 and the associated head 41. A collar 57 is fixed on the rod 44 rearwardly of the head 41, of the arm 32, and a spring 58 is mounted on the rod 44 between the collar 57 and the associated head 41. The springs 53, 54, 56 and 58 are provided for the purpose hereinafter set forth.

The independent operating lever 46, the brake pedal 47 and the emergency brake lever 48 are all mounted in the vehicle, in the usual manner, within convenient reach of the driver. The levers 46 and 48 are similar in construction, and are provided with suitable latching elements 59 for securing same in the operative or released positions.

In the use of my improved four-wheel drive transmission, the rear drive shaft 7 connects with and drives the rear axle transmission in the usual manner well known in the art. The front axle transmission connects with the drive shaft 6, and is identical to the ordinary rear axle transmission except that special wheel connecting elements 60 are essential to permit the driving and steering of the front wheels 61 at the same time. Such special wheel connecting elements 60, are clearly illustrated in Figure 8, and it is apparent that the same may be widely varied to best meet conditions found in practice, without departing from the spirit of the invention.

In practice, the operation of my improved four-wheel drive transmission, is as follows:—Assuming that all parts of the transmission are in the positions shown in Figure 1, and that the carrier gear 17 is in mesh with and driven by the driving gear 18, the entire carrier 1 will rotate at all times and the drive shafts 6 and 7 will normally be rotated in their respective bearings 9 and 10. The shaft gears 14 and 15 will, of course, rotate with respective drive shafts 6 and 7, as they are fixed to the latter. Normally, the spider gears 13 do not rotate on the bearing arms 12 but their engagement with the shaft gears 14 and 15 impart rotation to the latter and consequently to the associated drive shafts 6 and 7.

The connecting gear 23 is normally disengaged from the gear ring 22 and rotates with the front drive shaft 6, while the yoke 25 rides idly in the grooved hub 24 of the connecting gear 23.

It will here be noted, that under ordinary driving conditions, the connecting gear 23 is always maintained disengaged from the gear ring 22, in order to maintain the differential features of the device. If for any reason the front wheels 61 begin slipping or spinning, the rear wheels 50 will stop, or vice versa, of course. When either pair of wheels 50 or 61 is so slipping and spinning, the operator shifts the connecting gear 23 into engagement with the gear ring 22, and a positive non-differential drive is thereby imparted to both axles.

In shifting the connecting gear 23 into engagement with the gear ring 22 to provide traction, in the manner stated, the shifting is effected by the manipulation of the independent operating lever 46, which is simply pulled rearwardly and latched by the driver. The action of the spring 54 on the connecting rod 42 serves to resiliently cushion and tension the setting of the lever 46 in the engaging position. During the forward movement of the operating arm 30, the other arms 31 and 32 will likewise move forwardly. As the same are loosely connected with respective rods 43 and 44, the latter will not be shifted by such movement.

Each time the brake pedal 47 is depressed, for braking purposes, the connecting gear 23 will be shifted to engage the gear ring 22, and at the same time the brake band 34 will engage the drum 33 to effect the braking operation. As the braking action is effected by the action of the cam sleeve 39 against the cam bearing 37, the operating lever 40, on the brake shaft 36, will shift laterally outward with the latter, and as the brake arm 40 and the operating arm 31 are both connected with the same rod 43, the said arm 31 will likewise shift laterally outward during the braking operation, and is permitted to do so owing to its pivotal joint 31'. The action of the spring 56 serves to force the gear 23 into engagement with the gear ring 22 during the braking operation. When the brake pedal 47 is released, the action of the front spring 53 on the rod 42 will force the connecting gear 23 from its engagement with the gear ring 22, as the said spring 53 will have been tensioned by the braking operation.

Each time the emergency brake lever 48 is used to effect the braking operation, the action of the spring 58 will function to force the gear 23 into engagement with the gear ring 22. The operation of the brake lever 48 will also actuate the braking mechanism 49 to retard the operation of the rear wheels 50 in the usual manner. When the brake lever 48 is released the action of the spring 53 on the rod 42 will again force the gear 23 from the gear ring 22.

The purpose of shifting the connecting gear 23 into engagement with the gear ring 22, each time the pedal or emergency brakes are operated, is to establish a positive, non-differential connection between the carrier 1 and the shafts 6 and 7, so that uniform braking action to driving mechanism and vehicle is effected.

It is evident that the brake pedal 47 may likewise be provided with a rod extending to the usual wheel braking mechanism, in a manner referred to relatively to the emergency brake lever 48, but the braking action established by the brake band 34 on the brake drum 33, in the manner stated is very much more efficient and ample for all purposes. Further such latter braking feature assures uniform retardation of vehicle movement and requires but a minmum of adjustment.

The present invention discloses a most efficient device, for a four-wheel drive for motor vehicles, which provides differential operation to the front and rear wheels, and which embodies novel and conveniently operable means for establishing a positive drive to all of the wheels, whereby traction can invariably be assured.

What I claim is:

In a motor vehicle, the combination of a front drive shaft operatively connecting with the front wheels of the motor vehicle, a rear drive shaft operatively connecting with the rear wheels of the motor vehicle, a power transmission connecting with said front and rear drive shafts and operable for differentiating between the latter, a brake element embodied in said power transmission and operable for retarding the operation of the latter to provide a uniform braking action to the front and rear wheels of the motor vehicle, and means carried by said power transmission and actuated by the operation of said brake element for establishing a positive non-differential connection between said front and rear drive shafts during the braking operation.

In testimony whereof I affix my signature.

JESSE F. LIVINGOOD